Oct. 9, 1951    LA VERNE M. SCHULDT    2,570,390
TRUNK LID LOCK FOR AUTOMOBILES
Filed April 29, 1949
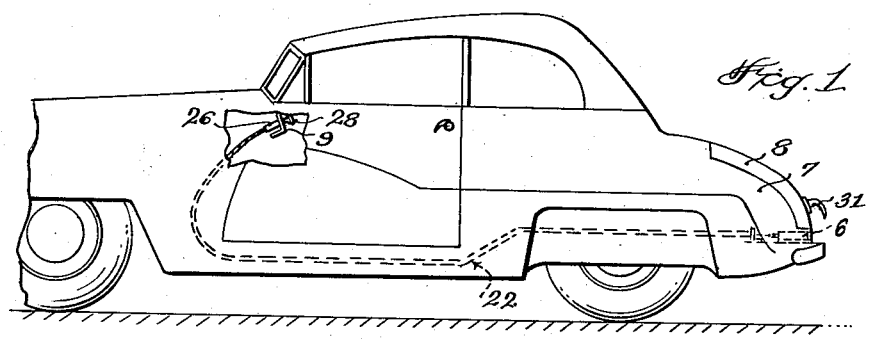
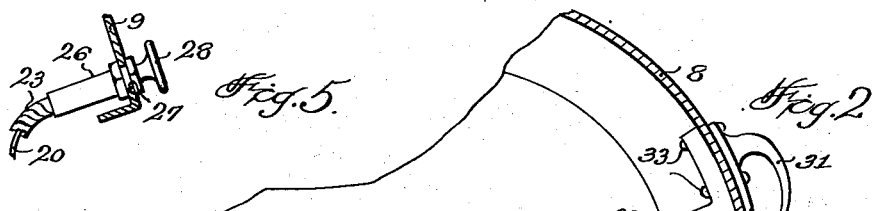
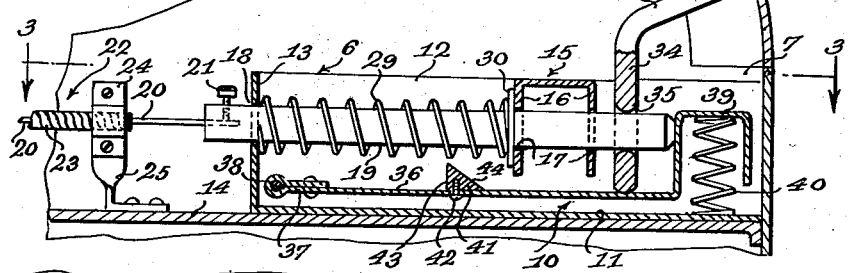
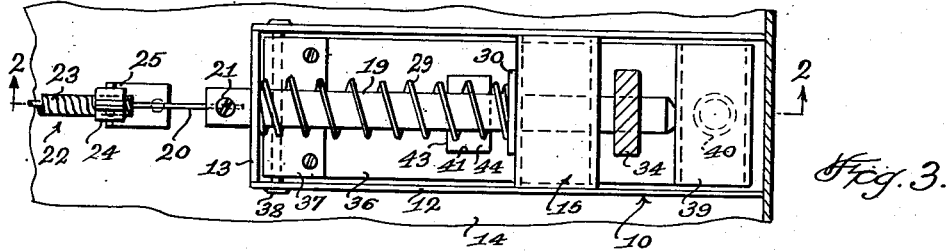
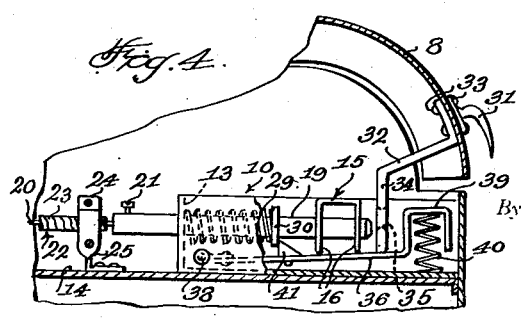
Inventor
LaVerne M. Schuldt
By John N. Randolph
Attorney Patented Oct. 9, 1951

2,570,390

UNITED STATES PATENT OFFICE 2,570,390

TRUNK LID LOCK FOR AUTOMOBILES

La Verne M. Schuldt, Stickney, S. Dak.

Application April 29, 1949, Serial No. 90,417

1 Claim. (Cl. 292—335)

This invention relates to a novel construction of lock for trunk lids of automobiles for enabling the lid to be automatically locked when moved to a closed position and to permit the lid to be unlocked only from within the automobile so that when the doors of the vehicle are locked and the windows closed it will be impossible to unlock the trunk lid without gaining access to the interior of the automobile.

The primary object of the present invention is to provide a trunk lock which will eliminate the need for a key for unlocking and locking the trunk and which will enable the trunk lid to be much more quickly and easily returned to a locked position and which will prevent the trunk lid from being accidentally left in an unlocked condition when closed.

A further object of the invention is to provide a novel spring means for partially opening the trunk lid when unlocked from within the car to prevent the trunk lid from being inadvertently re-locked until it is manually and forcibly returned to a fully closed position.

Still another object of the invention is to provide a novel trunk lock having a spring projected bolt which is normally held in a retracted position by a spring urged keeper which is automatically released to be spring biased to a locked position by the movement of the trunk lid forcibly to a fully closed position.

Various other objects and advantages of the invention will hereinafter become more fully apparent from the following description of the drawing, illustrating a presently preferred embodiment thereof, and wherein:

Figure 1 is a fragmentary side elevational view, partly broken away of an automobile showing the trunk lid lock in dotted lines and in side elevation applied thereto;

Figure 2 is an enlarged longitudinal sectional view through a portion of the trunk of an automobile showing the lock therein partly in side elevation and partly in longitudinal section and in a locked position and substantially along a plane as indicated by the line 2—2 of Figure 3;

Figure 3 is a horizontal sectional view thereof taken substantially along a plane as indicated by the line 3—3 of Figure 2;

Figure 4 is a fragmentary side elevational view partly broken away and on a reduced scale of the parts as illustrated in Figures 2 and 3 and illustrating the trunk lock in a released position, and Figure 5 is a side elevational view, partly in section illustrating a portion of the release actuator of the trunk lock.

For the purpose of illustrating a preferred application and use of the trunk lock, designated generally 6 and comprising the invention, a substantial portion of an automobile is illustrated in Figure 1 including an automobile trunk 7 having a conventional upwardly swinging hinged lid or closure 8. The instrument panel 9 of the automobile is also illustrated in Figure 1 and a portion thereof is shown in Figure 5.

The trunk lock 6 includes an elongated housing, designated generally 10 having a bottom 11, corresponding side walls 12 and a forward end wall 13. The housing 10 is suitably secured to the floor or bottom 14 of the trunk 7 or may be located in a recess or channel thereof and longitudinally with respect to the motor vehicle and with the front end wall 13 disposed in a forwardmost position with respect to the housing 10. The housing 10 also includes an inverted substantially U-shaped guide member 15 which is disposed transversely thereof and intermediate of its ends and the ends of which are suitably secured to the side walls 12. The corresponding depending sides 16 of the guide member 15 are provided with aligned openings 17 which are likewise in alignment with an opening 18 of the front end wall 13 for reciprocally receiving and guiding a lock bolt or plunger 19 which extends through the openings 17 and 18.

The forward end of the bolt 19 extends forwardly from the housing 10 and is longitudinally recessed to receive an end of a wire 20 of relatively heavy gauge and which is adjustably secured in the bolt or plunger 19 by a setscrew 21 which is threaded radially into the bolt 19. The wire 20 comprises a part of a manual bolt actuator, designated generally 22 and which also includes an elongated relatively flexible tube 23 one end of which is disposed forwardly of and adjacent the housing 10 and detachably mounted in the upper clamp portion 24 of a bracket 25 which is fastened to the trunk floor 14. The tube 23, containing the wire 20 extends forwardly from the trunk 7 beneath the vehicle body, as illustrated in dotted lines in Figure 1 and is turned upwardly at a point forwardly of the vehicle dashboard, not shown, and extends upwardly and rearwardly therethrough. The opposite end of the tubular member 23 is secured in a clamping unit 26 which extends through an opening 27 of the instrument panel 9 and which is clamped thereto. The opposite end of the wire 20 extends through the clamping unit 26 and is suitably secured to a knob or button 28 which is disposed on the front side of the instrument panel 9 and at a point convenient to the driver of the vehicle.

An expansion coiled spring 29 is carried by the lock bolt or plunger 19 and has one end thereof bearing against the inner side of the housing wall 13 and its opposite end bearing against a collar 30 which is fixed to the bolt 19 for normally holding said bolt in a projected position, as illustrated in Figures 2 and 3 and with the collar 30 disposed against the guide 15 and forming a stop for limiting the movement of the bolt 19 toward a projected position under the biasing action of the spring 29.

A stationary handle 31 is secured to the outer side of the trunk lid 8 adjacent its free end and a stationary keeper 32 is secured at one end to the inner side of the trunk lid 8 preferably by fastenings 33 which likewise secure the handle 31 to the lid 8. The keeper 32 comprises an elongated bar having a downwardly extending forwardly offset opposite free end 34 which is disposed partially in the housing 10 when the lid 8 is in a fully closed position and which has an opening 35 to align with the openings 17 and 18 for receiving the rear end of the latch bolt 19.

A lever 36 is disposed in the bottom portion of the housing 10 and longitudinally thereof and has a loop 37 at its forward end through which a pin 38 extends. The pin 38 extends transversely through the housing 10 near its forward end and is anchored at its ends in the side walls 12 for swingably mounting the lever 36 within the housing 10 for vertical or up and down movement with respect thereto. The lever 36 is provided with an upwardly offset portion 39 adjacent its free end and disposed near the rear end of the housing 10 and beyond the rear end of the bolt 19, when the latter is in a projected position as seen in Figures 2 and 3 to provide a downwardly opening recess for an expansion coiled spring 40 one end of which bears on the housing bottom 11 and the other end of which bears against the underside of the upwardly offset portion 39 for urging the lever 36 to swing upwardly on its pivot 38. A detent 41 is secured by fastenings 42 to the upper side of the lever 36 and transversely thereof and between the housing wall 13 and guide 15 and is provided with a forwardly facing substantially upright shoulder 43 and an inclined opposite, rear surface 44 forming a cam surface.

Assuming that the trunk lid 8 is locked in a closed position by the lock 6 and as illustrated in Figures 2 and 3, it will be readily apparent that the bolt or plunger 19 cannot be retracted for releasing the keeper 34 except by a forward pull exerted thereon by the wire 20 and as such wire is accessible only at its knob end 28 and within the automobile, it will be readily apparent that the trunk lid cannot be unlocked and opened except when access can be had to the interior of the automobile so that if the doors thereof are locked and the windows closed the trunk cannot be unlocked and opened. When it is desired to unlock and open the trunk lid 8, a pull is exerted on the knob or button 28, within the automobile which causes the rear end of the wire 20 to be displaced forwardly through the tube 23 for moving the bolt or plunger 19 forwardly or from right to left of Figures 2 and 3. As this occurs the bolt 19 will be moved out of engagement with the keeper opening 35 as its collar 30 engages the cam surface 44 of the detent 41 to cause the lever 36 to be swung downwardly to permit the collar 30 to pass over the detent 41 as the bolt 19 completes its forward travel to a retracted position as seen in Figure 4. As the collar 30 clears the detent 41 the spring 40 will thereby be released to expand to move the detent 41 upwardly behind the collar 30 so that said collar will engage the forwardly facing detent shoulder 43 which will retain the bolt 19 in a forward or retracted position. This upward swinging movement of the lever 36 will also force the trunk lid keeper 32 upwardly for slightly elevating the trunk lid 8 and for displacing the keeper 32 upwardly sufficiently so that its opening 35 will be above and out of registry with the bolt 19. It will be apparent that the lid 8 may then be grasped by the handle 31 and swung to a fully opened position to afford complete access to the trunk 7 and if it is not desired to re-lock the trunk immediately, the lid 8 may be gently returned to its position of Figure 4 and will be supported by the lever 36 in a slightly elevated position and unlocked so that it can be re-opened at will. To re-lock the trunk lid 8 so that it cannot be again re-opened except by exerting a pull on the knob or button 28, it is only necessary to forcibly return the lid 8 to its fully closed position of Figures 1 and 2 so that the lower end of the stationary keeper portion 34 will force the lever 36 downwardly and back to its position of Figure 2 to return the keeper opening 35 into registry with the opening 17 and to move the detent 41 downwardly and out of engagement with the collar 30 so that the spring 29 may return the lock bolt 19 rearwardly and to its locking positions of Figures 2 and 3 and so that it will pass through the opening 35. The spring 29 is of sufficient strength to exert a pull on the wire 20 to return it to its position of Figures 2 and 3 and so that the knob or button 28 will be pulled back to a position against the clamp unit 26 and will thus provide a visual indicator for indicating when the trunk is locked or unlocked.

Various modifications and changes are contemplated and may obviously be resorted to, without departing from the spirit or scope of the invention as hereinafter defined by the appended claim.

I claim as my invention:

A closure lock adapted to engage a keeper comprising a lock housing secured within an enclosure, a lock bolt reciprocally mounted in said housing for sliding movement between a retracted, inoperative position and a projected, locking position, manually actuated means connected to the lock bolt adapted to be operated from a position remote thereto for retracting the lock bolt, a collar fixed to the lock bolt, spring means disposed between the collar and a portion of the housing for biasing the lock bolt toward a locking position, a lever pivotally mounted at one end thereof in the housing and disposed beneath the lock bolt, a spring engaging under the lever for rocking the lever in a direction toward the lock bolt, a detent secured to the lever and projecting therefrom toward the lock bolt having an inclined cam surface facing toward one end of the lever and engaged by the collar when the lock bolt is moved to a retracted position for rocking the lever away from the lock bolt to displace the detent out of the path of movement of the collar, and said detent having a shoulder facing in the opposite direction and engaging the collar to retain the lock bolt in a retracted, inoperative position.

LA VERNE M. SCHULDT.

REFERENCES CITED

The following references are of record in the file of this patent:

UNITED STATES PATENTS

| Number | Name | Date |
|---|---|---|
| 299,140 | Hill | May 27, 1884 |
| 1,570,135 | Emmert | Jan. 19, 1926 |
| 2,158,451 | Wilson | May 16, 1939 |
| 2,202,834 | Clarkson-Jones | June 4, 1940 |
| 2,316,692 | Hill | Apr. 13, 1943 |
| 2,317,617 | Kaufman | Apr. 27, 1943 |

FOREIGN PATENTS

| Number | Country | Date |
|---|---|---|
| 268,252 | Great Britain | Mar. 31, 1927 |